(12) United States Patent
Chun

(10) Patent No.: US 11,252,154 B2
(45) Date of Patent: Feb. 15, 2022

(54) APPARATUS AND SERVER FOR SHARING POSITION INFORMATION OF VEHICLE

(71) Applicants: Hyundai Motor Company, Seoul (KR); Kia Motors Corporation, Seoul (KR)

(72) Inventor: Chang Woo Chun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 318 days.

(21) Appl. No.: 16/207,511

(22) Filed: Dec. 3, 2018

(65) Prior Publication Data

US 2020/0076800 A1    Mar. 5, 2020

(51) Int. Cl.
| | |
|---|---|
| *H04L 29/06* | (2006.01) |
| *H04W 4/40* | (2018.01) |
| *H04W 12/06* | (2021.01) |
| *H04W 4/029* | (2018.01) |
| *H04L 29/08* | (2006.01) |

(52) U.S. Cl.
CPC ......... *H04L 63/0876* (2013.01); *H04W 4/029* (2018.02); *H04W 4/40* (2018.02); *H04W 12/06* (2013.01); *H04L 67/02* (2013.01)

(58) Field of Classification Search
CPC ... H04L 9/32; H04L 63/0853; H04L 63/0876; G06F 21/34; G06F 2221/2111
See application file for complete search history.

(56) References Cited

U.S. PATENT DOCUMENTS

| | | |
|---|---|---|
| 7,496,948 B1 | 2/2009 | Hamilton, II et al. |
| 10,015,654 B2 | 7/2018 | Ossin et al. |
| 10,200,364 B1 * | 2/2019 | Ketharaju ............. H04W 12/66 |
| 10,264,389 B1 | 4/2019 | Hwang et al. |
| 10,509,095 B1 | 12/2019 | Kim |
| 10,560,823 B1 | 2/2020 | Chen et al. |
| 10,672,060 B2 | 6/2020 | Ricci |
| 10,726,652 B2 | 7/2020 | Jinnai et al. |
| 2002/0115436 A1 | 8/2002 | Howell et al. |
| 2005/0120200 A1 | 6/2005 | Brignone et al. |
| 2005/0288827 A1 | 12/2005 | Watkins |
| 2006/0122773 A1 | 6/2006 | Nou |
| 2006/0155461 A1 | 7/2006 | Cho |
| 2009/0119657 A1 | 5/2009 | Link, II |
| 2010/0211649 A1 | 8/2010 | Dimas et al. |
| 2011/0112969 A1 | 5/2011 | Zaid et al. |
| 2011/0234399 A1 | 9/2011 | Yan |

(Continued)

*Primary Examiner* — Jason K Gee
(74) *Attorney, Agent, or Firm* — Mintz Levin Cohn Ferris Glovsky and Popeo, P.C.; Peter F. Corless

(57) ABSTRACT

An apparatus for sharing location information of a vehicle may include: a communication circuit configured to communicate with a server, and a processor electrically connected with the communication circuit. The processor may be configured to receive, via the communication circuit, authentication information for sharing the location information of the vehicle from the server; transmit, via the communication circuit, the authentication information to an external device, which is a target for sharing the authentication information, such that the external device receives the location information from the server; and acquire the location information from the server using the authentication information.

11 Claims, 10 Drawing Sheets

(56) References Cited

U.S. PATENT DOCUMENTS

| | | | |
|---|---|---|---|
| 2012/0144452 A1* | 6/2012 | Dyor | H04L 63/107 |
| | | | 726/4 |
| 2013/0104035 A1* | 4/2013 | Wagner | G06F 16/29 |
| | | | 715/240 |
| 2013/0166073 A1 | 6/2013 | Pine et al. | |
| 2013/0249713 A1 | 9/2013 | Adelson | |
| 2013/0274953 A1* | 10/2013 | Miljkovic | G07C 5/008 |
| | | | 701/1 |
| 2014/0026193 A1* | 1/2014 | Saxman | H04L 63/102 |
| | | | 726/4 |
| 2015/0127493 A1 | 5/2015 | Winkelman et al. | |
| 2015/0168168 A1* | 6/2015 | Kustanowitz | G01S 5/0027 |
| | | | 701/410 |
| 2015/0256973 A1 | 9/2015 | Raounak | |
| 2017/0187707 A1 | 6/2017 | Miu et al. | |
| 2018/0262891 A1 | 9/2018 | Wu et al. | |
| 2018/0357898 A1 | 12/2018 | Kamini et al. | |
| 2019/0132719 A1 | 5/2019 | Mizutani et al. | |
| 2019/0156279 A1 | 5/2019 | Fujiwara | |
| 2019/0205797 A1 | 7/2019 | Sakurada et al. | |
| 2019/0208024 A1* | 7/2019 | Jablonski | H04L 69/18 |
| 2019/0295142 A1 | 9/2019 | Paulucci et al. | |
| 2019/0299802 A1 | 10/2019 | Neubecker et al. | |
| 2020/0084193 A1 | 3/2020 | Beaurepaire et al. | |
| 2020/0126175 A1 | 4/2020 | Fong et al. | |
| 2020/0168088 A1 | 5/2020 | Goluguri | |

\* cited by examiner

APPARATUS AND SERVER FOR SHARING POSITION INFORMATION OF VEHICLE

CROSS-REFERENCE TO RELATED APPLICATION

This application claims the benefit of priority to Korean Patent Application No. 10-2018-0106011, filed in the Korean Intellectual Property Office on Sep. 5, 2018, the entire contents of which are incorporated herein by reference.

TECHNICAL FIELD

The present disclosure relates to a system for sharing location information of a vehicle with external devices.

BACKGROUND

As the vehicle industry has developed, wireless communication technologies have become increasingly important for the purpose of providing convenience for drivers. For example, some wireless communication-based services for enhancing driver convenience utilize location information and state information of vehicles. To provide such services, a vehicle may be required to share its location and state information with various external devices.

However, many conventional techniques for sharing location and state information of a vehicle with external devices are inefficient. In addition, since the location and state information of a vehicle can be personal (i.e., private), security issues may arise.

SUMMARY

The present disclosure has been made to solve the above-mentioned problems occurring in the related art while advantages achieved by the related art are maintained intact.

An aspect of the present disclosure provides an apparatus, a server, and a system capable of providing an efficient and safe manner for sharing location information and state information of a vehicle.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for sharing location information of a vehicle may include: a communication circuit configured to communicate with a server, and a processor electrically connected with the communication circuit. The processor may be configured to receive, via the communication circuit, authentication information for sharing the location information of the vehicle from the server; transmit, via the communication circuit, the authentication information to an external device, which is a target for sharing the authentication information, such that the external device receives the location information from the server; and acquire the location information from the server using the authentication information.

The external device may be selected depending on a type of a service to be provided using the location information.

The external device may be selected based on user input provided to the apparatus.

The processor may be configured to acquire the location information through a web-page provided by the server.

The processor may be configured to acquire the location information in a HyperText Transfer Protocol (HTTP) response to an HTTP request provided by the server.

The processor may be configured to acquire the location information through a notification provided by the server.

The processor may be configured to periodically acquire the location information from the server using the authentication information.

The processor may be configured to determine whether the vehicle enters and/or exits a specified location using the location information.

The processor may be configured to determine whether the vehicle departs from, approaches, and/or arrives at a specified location using the location information.

The authentication information may allow the external device to receive the location information through authentication by the server.

The location information may include information indicating at least one of a location, an origin, a destination, an expected arrival time, and a moving path of the vehicle.

The processor may be configured to authenticate the external device using the authentication information, and to transmit, via the communication circuit, the location information to the authenticated external device.

Furthermore, according to embodiments of the present disclosure, a non-transitory computer readable medium may contain program instructions for sharing location information of a vehicle, the program instructions when executed by a processor causing the processor to: receive, via a communication circuit, authentication information for sharing the location information of the vehicle from a server; transmit, via the communication circuit, the authentication information to an external device, which is a target for sharing the authentication information, such that the external device receives the location information from the server; and acquire the location information from the server using the authentication information.

Furthermore, according to embodiments of the present disclosure, a server for sharing location information of a vehicle may include a communication circuit configured to communicate with the vehicle, and a processor electrically connected with the communication circuit. The processor may be configured to receive, via the communication circuit, the location information of the vehicle and identification information of an external device, which is a target for sharing the location information of the vehicle, from the vehicle, transmit, via the communication circuit, authentication information for sharing the location information to the external device, authenticate the external device, or another device which receives the authentication information from the external device, using the authentication information, and transmit, via the communication circuit, the location information to the authenticated device.

The external device may include at least one of a user terminal, an Internet of things (IoT) device, a payment system, a positioning system, an emergency rescue system, an insurance system, and an external vehicle.

The processor may be configured to acquire, via the communication circuit, the location information and at least one of personal information, personal identification information, vehicle state information, vehicle guide information, and security information, from the vehicle; and transmit, via the communication circuit, the acquired information to the authenticated device.

BRIEF DESCRIPTION OF THE DRAWINGS

The above and other objects, features and advantages of the present disclosure will be more apparent from the following detailed description taken in conjunction with the accompanying drawings.

Figure 1:
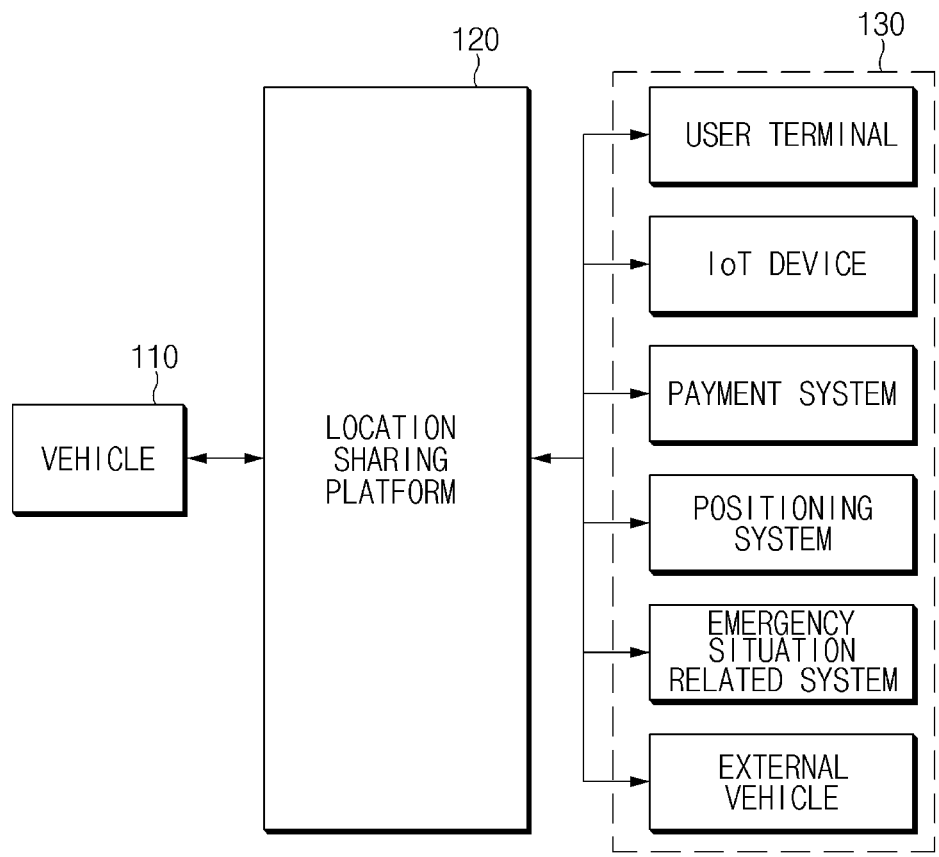
FIG. 1 is a block diagram illustrating an operating environment of a system for sharing location information of a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, some embodiments of the present disclosure will be described in detail with reference to accompanying drawings. In the following description, the same reference numerals will be assigned to the same components even though the components are illustrated in different drawings. In addition, in the following description of an embodiment of the present disclosure, a detailed description of well-known features or functions will be ruled out in order not to unnecessarily obscure the gist of the present disclosure.

In describing components of exemplary embodiments of the present disclosure, the terms $1^{st}$, $2^{nd}$, first, second, A, B, (a), (b), and the like may be used herein. These terms are only used to distinguish one component from another component, but do not limit the corresponding components irrespective of the order or priority of the corresponding components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 is a block diagram illustrating an operating environment of a system for sharing location information of a vehicle (alternatively referred to herein as "vehicle location information sharing system"), according to embodiments of the present disclosure.

As shown in FIG. 1, the vehicle location information sharing system may include a vehicle 110, a location sharing platform 120, and a sharing-target device 130.

The vehicle 110 may collect the location information and the state information of the vehicle 110 and may transmit the collected information to the location sharing platform 120. The location sharing platform 120 may receive, manage, and process the location information and the state information of the vehicle 110. The sharing-target device 130 may provide a service for a user using the shared location information.

For example, a user terminal may receive the location information and the state information using a web-browser and a dedicated application, may provide the received information for the user, and may share the location information and the state information with another device. Internet of Things (IoT) devices (e.g., a voice recognition speaker, an air conditioning system, an electric lamp, a television (TV), a closed circuit television (CCTV), a wall pad, a boiler, or the like) may perform various operations when a vehicle enters a parking lot. A payment system (e.g., a parking lot payment system, an electronic toll collection system (ETCS), a driver through payment system, or the like) may perform payment and business processes using the location information. A positioning system (e.g., a path searching server) may provide services such as a path searching service and a traffic information providing service using the location information. An emergency situation related system (e.g., an insurance system or an emergency rescue system) may check the location information and the state information of the vehicle 110 when car accident or car stealth happens. An external vehicle may bi-directionally share location information with the vehicle 110 and may utilize the location information in fleet driving.

In addition, the location information is shared to provide various services such as movement state of public transportation, carpool-vehicle notification, car-sharing, the location inquiry of emergency vehicle, the location inquiry of a battery charging vehicle, notification of danger zone entrance, or notification of safety zone exit.

Figure 2:
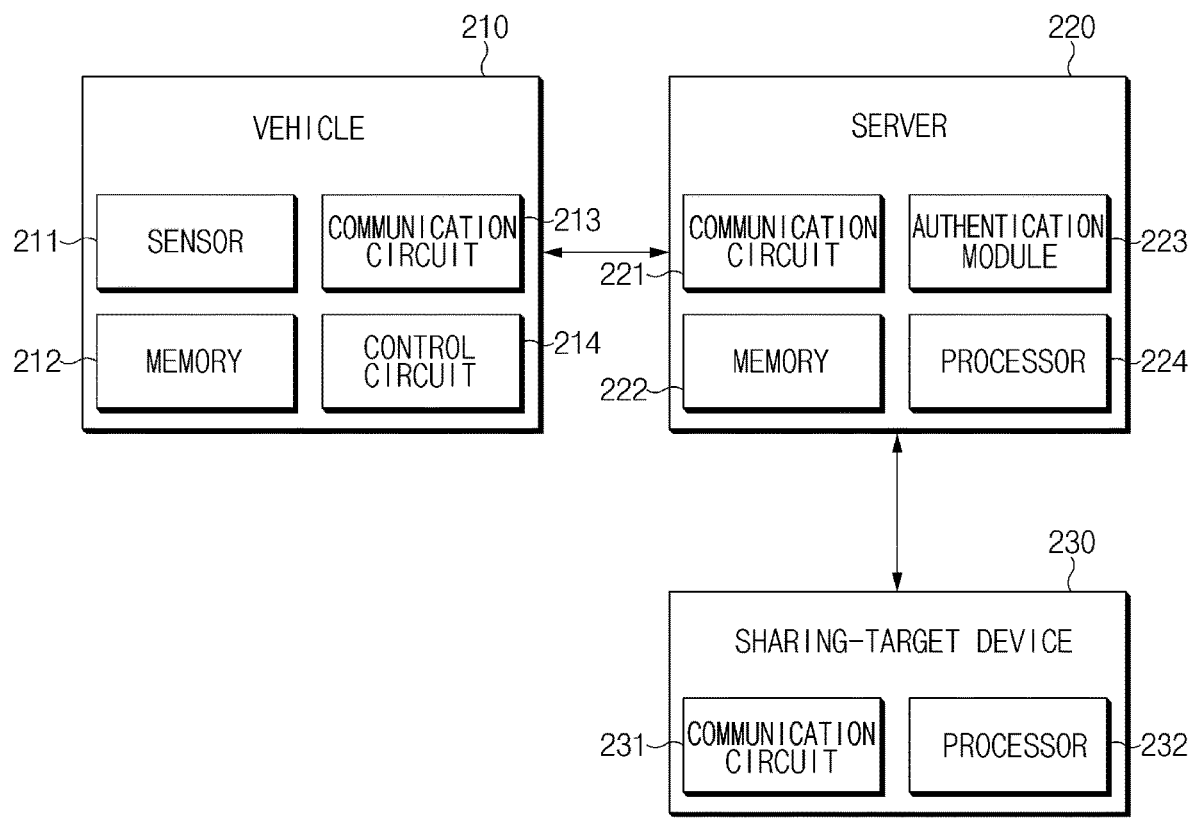
FIG. 2 is a block diagram illustrating the configuration of a vehicle, a server, and a sharing-target device, according to embodiments of the present disclosure.

FIG. 2 is a block diagram illustrating the configuration of a vehicle, a server, and a sharing-target device, according to embodiments of the present disclosure.

As shown in FIG. 2, a vehicle 210 may include a sensor 211, a memory 212, a communication circuit 213, and a control circuit 214.

The sensor 211 may detect information indicating at least one of a position, a speed, an acceleration, an angular velocity, an altitude, a door lock/unlock, a door open/close, a trunk open/close, a hood open/close, a start on/off, a battery charge state, and a tire air pressure.

The memory 212 may store map information, passenger information and vehicle/AVN serial information.

The communication circuit 213 may transmit the location information and the state information of the vehicle 210 to a location sharing platform. The location information may include, for example, present location information (e.g., coordinates, an address, road information, a vehicle advancing direction, a speed, a current time, or the like) and a destination information (e.g., a name, coordinates, an address, a remaining time, a remaining distance, or the like). The state information of the vehicle 210 may include information relating to air conditioning (e.g., air conditioning on/off, air conditioning setting requirements, a temperature, a strength, an operating mode, defrost, or the like), an engine (e.g., non/on/off), a transmission (e.g., a transmission type, a gear lever position, or the like), a door (e.g., door lock/unlock, a door opening/closing, a trunk opening/closing, a hood opening/closing, a sunroof opening/closing, or the like), a hot-wire (e.g., steering wheel, a rear glass, a seat, or the like), a power state of an electric vehicle, a battery (e.g., a battery charging state, a charge amount, a charging time, a drivable distance, or the like), fuel (e.g., a remaining amount of fuel, a drivable distance, or the like), etc.

The control circuit 214 may be electrically connected with the sensor 211, the memory 212, and the communication circuit 213. The control circuit 214 may control the sensor 211, the memory 212, and the communication circuit 213 and may perform various data processing and various arithmetic computations. The control circuit 214 may include, for example, an electronic control unit (ECU) mounted on the vehicle 210 or a sub-controller.

The vehicle 210 may share the location information with the server 220 without an additional operation of a driver. For example, the vehicle 210 may monitor the vehicle state. When the state of the vehicle 210 is changed, the vehicle 210 may transmit the changed information to the server 220. For another example, the vehicle 210 may activate location sharing when turning on, may transmit the location information to the server 220 at shorter time intervals when the vehicle 210 is driving, and may transmit the location information at a longer time interval when the vehicle 210 is not driving. For another example, the vehicle 210 may transmit the location information to the server 220 when the state (e.g., a search, path search, path cancel, destination arrival, or the like) of the navigation is changed.

According to embodiments of the present disclosure, the server 220 may include a communication circuit 221, a memory 222, an authentication module 223, and a processor 224. The server 220 may include a location sharing platform.

The communication circuit 221 may receive the location information, the state information, information on a person (recipient) receiving information to be shared, and/or sharing condition information, which is transmitted from the vehicle 210, and may transmit information for sharing a location to a sharing-target device 230.

The memory 222 may include a database for sharing location information and state information of each vehicle.

The authentication module 223 may perform an authentication procedure with the vehicle 210 and may perform an authentication procedure with the sharing-target device 230. The authentication module 223 may be implemented separately from or integrally with another component.

The processor 224 may be electrically connected with a communication circuit 221, a memory 222, and an authentication module 223. The processor 224 may control the communication circuit 221, the memory 222, and the authentication module 223 and may perform various data processing and various computations.

According to embodiments of the present disclosure, the processor 224 may acquire the location information of the vehicle 210 and identification information of the sharing-target device 230, which is to receive the location information to be shared, through the communication circuit 221 from the vehicle 210.

The processor 224 may transmit authentication information, which is used for sharing the location information, to the sharing-target device 230. The authentication information may be necessary to perform authentication for security communication between the server 220 and the sharing-target device 230. The authentication information may include, for example, the intrinsic information, such as a vehicle identification number (VIN), an integrated circuit card identifier (ICCID), a universal subscriber identity module (USIM) number, an international mobile equipment identify (IMEI), or a serial number of a terminal modulator and de-modulator (MODEM), of a terminal of the vehicle 210, an ID, a password, or a security code arbitrarily created. For another example, the authentication information may include active time and a temporary code having search authority.

The processor 224 may authenticate the sharing-target device 230 or another device, which receives the authentication information from the sharing-target device 230, using the authentication information, and may transmit the location information to the authenticated device. The sharing-target device 230 may include at least one of a user terminal, an IoT payment system, a positioning system, an emergency rescue system, an insurance system, or an external vehicle. According to an embodiment, the processor 224 may acquire at least one of personal information, personal ID information, vehicle state information, vehicle guide information or security information together with the location information from the vehicle 210, and may transmit, to the authenticated device, at least one of the acquired information together with the location information.

The vehicle 210 and the server 220 may perform the following authentication procedure for security. The server 220 may receive production information created at a time point that the vehicle 210 (e.g., audio, video, and navigation (ANV) of the vehicle 210) is produced or may interwork with a system that the production information is loaded. When a mobile communication network of the vehicle 210 is open, the server 220 may send an authentication number to the vehicle 210. The vehicle 210 may encrypt an authentication number using, as a key, internal information, such as VIN, ICCID, IMEI, or the like of the vehicle 210 and may transmit the encrypted authentication number to the server 220. The server 220 may decrypt the encrypted authentication number using the internal information of the vehicle 210 and may verify the authentication number.

When the authentication number is verified, the server 220 may issue an encrypted key for security communication to the vehicle 210. The vehicle 210 may sign on an ACK message using the encrypted key, and may transmit the ACK message to the server 220, and the server 220 may verify the sign. The vehicle 210 may transmit a location sharing activation signal to the server 220 using an encryption key for location sharing activation. The server 220 may verify the sign and may issue a temporary key for transmission of the location information using the encrypted key. The vehicle 210 may encrypt location information, state information, and identification information of the recipient using the temporary key and may transmit the encrypted information to the server 220.

According to embodiments of the present disclosure, the sharing-target device 230 may include a communication circuit 231 and a processor 232. The sharing-target device 230 may be a device corresponding to ID information of the recipient, which is to be transmitted to the server 220 from the vehicle 210.

The communication circuit 231 may be configured to communicate with the server 220.

The processor 232 may be electrically connected with the communication circuit 231, may control the communication circuit 231 and another component, and may perform various data processing and various computations.

The processor 232 may receive authentication information for sharing the location information of the vehicle 210 from the server 220 using the communication circuit 231. The location information may include, for example, information on at least one of the location, a starting place, a destination, an expected arrival time, and a moving path of the vehicle.

The processor 232 may transmit authentication information to an external device using the communication circuit 231 such that another external device, which is to share the authentication information, acquires the location information from the server 220. The authentication information may be configured, such that the external device receives the location information through the authentication by the server 220. According to embodiments of the present disclosure, the processor 232 may authenticate the external device using the authentication information and may transmit the location information to the authenticated device. The processor 232 may perform authentication and transmission through a manner similar to that of the server 200 or using the server 220.

The external device may be selected according to the type of a service to be used using the location information. The service may include, for example, a real-time location sharing service, a real-time location inquiry service, and a real-time location notification service. The real-time location sharing service may be service for checking the state, the location, the destination, the path, and the parking position of the vehicle 210 for specified sharing time in real-time. The real-time location sharing service may update the location of the vehicle 210 on a map in real-time, and may transmit a message. The destination, the traveling path, and the expected arrival time of the vehicle 210 may be provided depending on the selection of a person (sharer) providing the information for sharing. In addition, an alert may be provided at 10 minutes before the vehicle 210 arrives or at the moment when the vehicle 210 arrives, depending on the selection of the recipient. The real-time location inquiry service allows a user to check location coordinates or an address of the vehicle 210 in a request/response scheme one time. The real-time location notification service may automatically provide a notification including information such as the location and the destination of the vehicle 210 at the time point that the vehicle 210 enters a specific point, a specific region, or a specific radius.

The external device may be selected based on a device input by a user. The device input by the user may be made in the vehicle 210 and may be made in the sharing-target device 230.

The processor 232 may acquire location information from the server 220 using the authentication information. The processor 232 may periodically acquire the location information using the authentication information. For example, when the sharing-target device 230 is a smartphone, a personal computer, a tablet, or the like, the processor 232 may acquire location information through a web-page provided from the server 220 (real-time sharing service). For example, when the sharing-target device 230 is an external vehicle, an IoT device, or an emergency situation related system, the processor 232 may acquire location information in a HyperText Transfer Protocol (HTTP) response to an HTTP request provided from the server 220 (real-time location inquiry service). For another example, when the sharing-target device 230 is a payment system, the processor 232 may acquire location information through a notification provided by the server 220 (real-time location notification service). The processor 232 may determine the entrance of the vehicle 210 to the specified location and/or the exit of the vehicle 210 out of the specified location. The processor 232 may determine at least one of starting, approaching, or arriving of the vehicle 210 with respect to the specified position.

Table 1 shows description of information shared by the vehicle location information sharing system, according to embodiments of the present disclosure.

TABLE 1

| Classification | Attributes | Examples of data |
|---|---|---|
| Personal information | Information owned by person | Name, address, type of vehicle, payment information, contacts, latest destination, favorites, or the like |
| Personal location information | Location information of person | Time, vehicle location, starting place, destination, expected arrival time, moving path, or the like |
| Personal identification information | Information used to identify person | Resident registration information, name, e-mail, phone number, ID, credit card number, or the like |
| Vehicle state information | Information of vehicle irrelevant to person | Air conditioning/engine/transmission/door/fuel amount/charging state |
| Vehicle safety information | Information associated with driver/vehicle | Airbag deployment information, stealth detection signal, vehicle failure information, roll-over sensor information, or the like |
| Security information | Authentication information to identify person | Log-in password, Access token, OTP code, VIN/NADID, security authentication key, or the like. |

Table 2 shows a use time point and a transmission time point of information shared in the vehicle location information sharing system, according to embodiments of the present disclosure.

TABLE 2

| | | Transmission time point | |
|---|---|---|---|
| Classification | Use time point | Vehicle ←→ Server□ | Server ←→ □sharing-target device |
| Personal information | Change of location sharing setting | Time point to change setting information | Time point to share location |
| Personal location information | Location sharing starting/sharing | Real-time transmission | Location being receiving |
| Personal identification information | Connected car service subscription, Location sharing service subscription | Log-in/authentication time point | |
| Vehicle state information | Time point to inquire vehicle state | Time point to change state information | |
| Vehicle safety information | Time point that safety accident is generated | Time point to change state information | |
| Security information | Time point to inquire personal location information | Time point to authenticate sharer | Time point to authenticate recipient |

The communication between the server 220 and the sharing-target device 230 may be based on previous authentication. When the sharing-target device 230 is an external vehicle, the authentication procedure of the sharing-target device 230 may be performed in the manner the same as the manner of authenticating between the vehicle 210 and the server 220. When the sharing-target device 230 is a server system, the authentication procedure may be performed according to transport layer security (TLS) standard. When the sharing-target device 230 is the IoT device, the authentication procedure may be performed based on the official certificate TLS standard by the server system for controlling the IoT device. When the sharing-target device 230 is a mobile terminal, the server 220 creates a uniform resource locator (URL) by hashing (SHA-256) information using an encryption key and may provide the URL to the mobile terminal.

Table 3 shows the description of sharing information, sharing time, and a recipient depending on the type of a service in a vehicle location information sharing system, according to embodiments of the present disclosure.

TABLE 3

| Service type | Level | Approach information | Sharing time | Recipient |
|---|---|---|---|---|
| Sharing service | 0 | Vehicle location/state | Always | Terminal/App. of recipient |
| Sharing service | 1 | Vehicle location | Sharing time | Terminal/App. of another person |
| Inquiry service | 2 | Vehicle location | Sharing time | Another person, corporation server |
| Notification service | 3 | Vehicle location | Receiving time | Recipient, Another person, cooperation server |
| Other service | 4 | Checking state of vehicle location | Receiving time | Business server |

Figure 3:
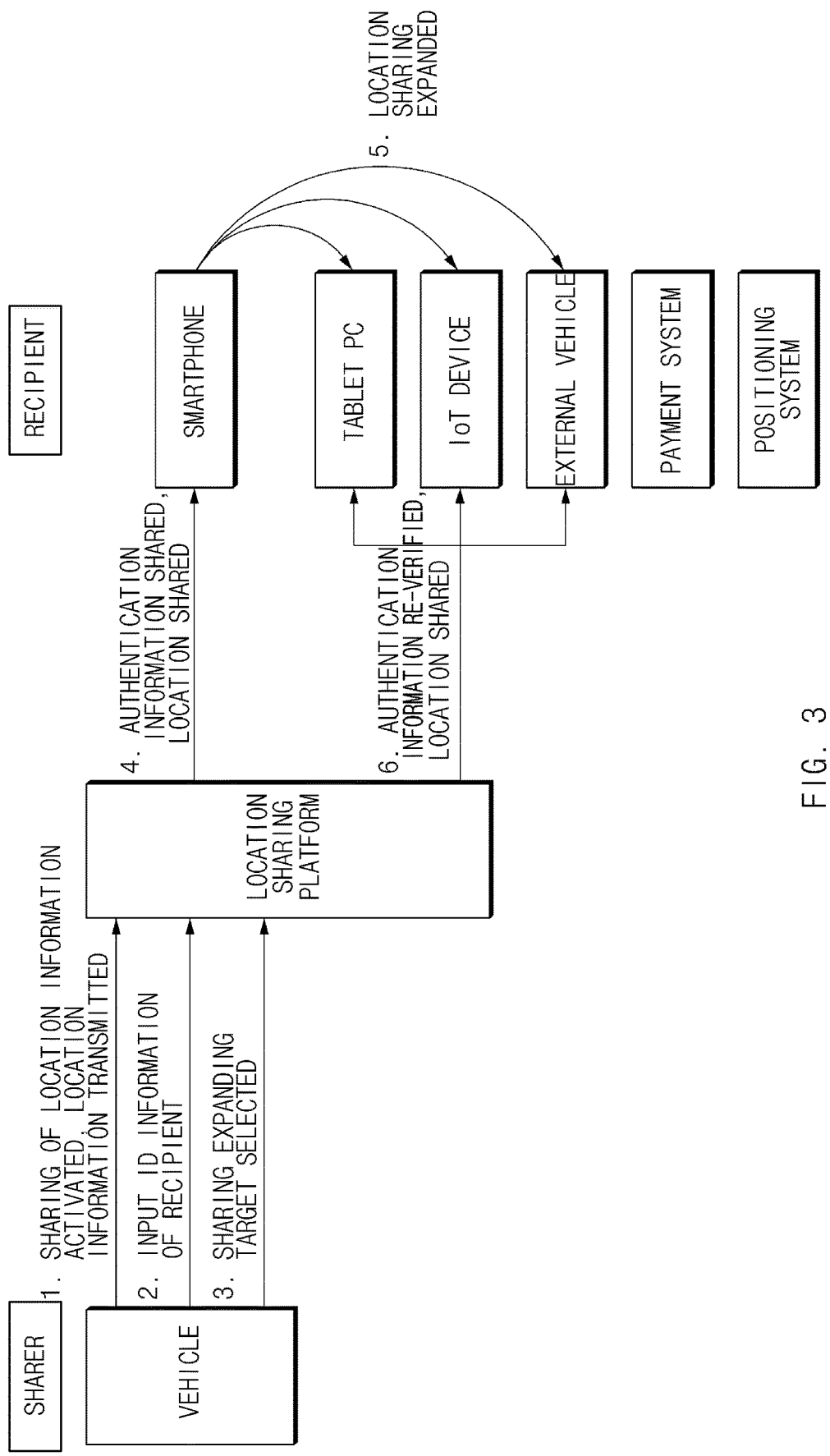
FIG. 3 is a view illustrating an exemplary operation of a system for sharing location information of a vehicle, according to embodiments of the present disclosure.

FIG. 3 is a view illustrating an exemplary operation of a vehicle location information sharing system, according to embodiments of the present disclosure.

As shown in FIG. 3, according to embodiments of the present disclosure, a vehicle may activate the sharing of location information. The vehicle may transmit location information to a location sharing platform. The vehicle may transmit identification information (e.g., the ID information of a smartphone) of a recipient to the location sharing platform. The vehicle may select a target (sharing expanding target) for expanding the sharing of the location information. For example, the vehicle may select a tablet, a PC, an IoT device, or an external vehicle as the sharing expanding target. The location sharing platform may share the authentication information with the smartphone. The smartphone may acquire location information from the location sharing platform using authentication information. The smartphone may transmit authentication information to the tablet, the PC, the IoT device, and the external device selected as the sharing expanding target. The tablet, the PC, the IoT device, and the external vehicle may receive the location information from the location sharing platform using the authentication information. The location sharing platform may re-verify the authentication information of the tablet, the PC, the IoT device, and the external vehicle, thereby performing the authentication.

Figure 4:
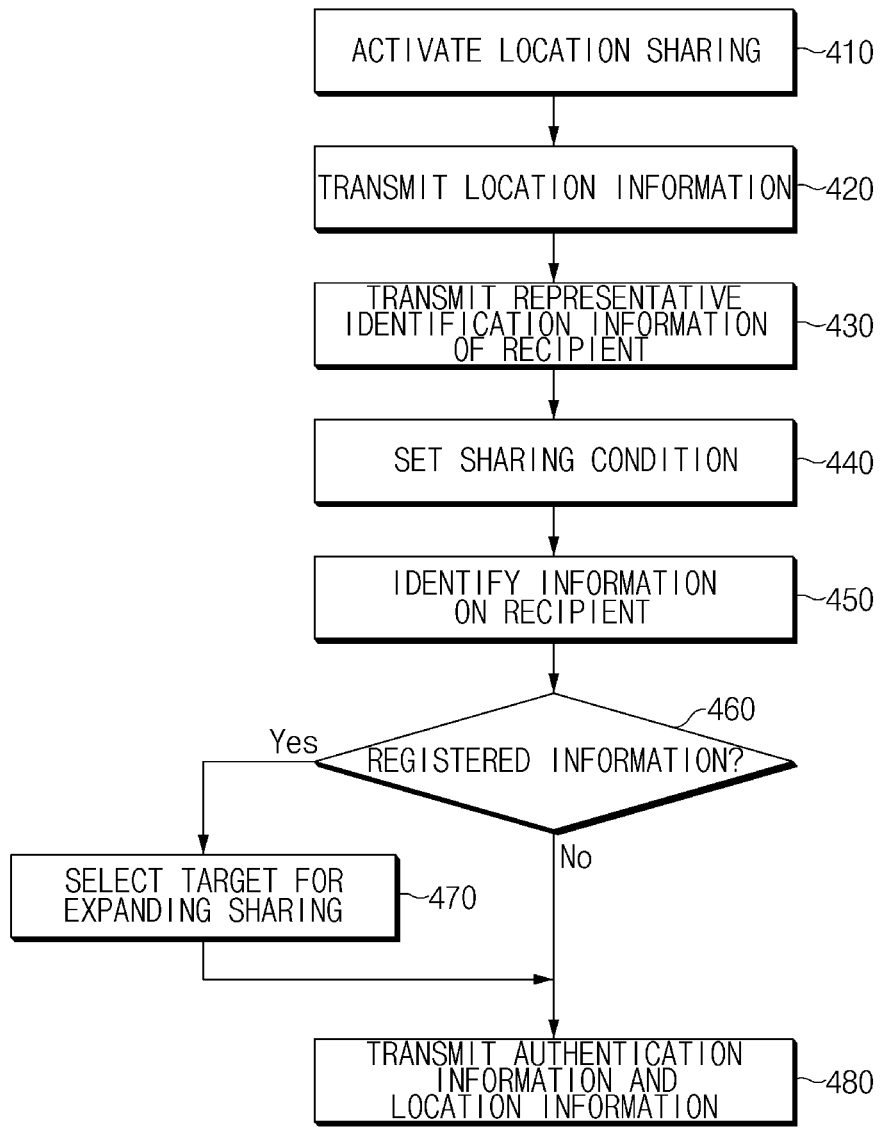
FIG. 4 is a flowchart illustrating a method for sharing location information of a vehicle, according to embodiments of the present disclosure.

FIG. 4 is a flowchart illustrating a method for sharing the location information of the vehicle, according to embodiments of the present disclosure. Hereinafter, it is assumed that the vehicle 210 or the server 220 of FIG. 2 performs the processor of FIG. 4.

As shown in FIG. 4, in operation 410, a vehicle may activate location sharing.

In operation 420, the vehicle may transmit location information to the server. The vehicle may periodically transmit the location information and the state information of the vehicle to the server when the location sharing is activated.

In operation 430, the vehicle may transmit representative identification information of a recipient. The vehicle may transmit representative ID information (e.g., portable phone number or an ID of an account corresponding to the portable number) of the sharing-target device to the server.

In operation 440, the vehicle may set a sharing condition. The vehicle may set information (e.g., a real-time location, a destination, a traveling path, an expected time, an authority, and the type of sharing service or the like) to be shared with the sharing-target device.

In operation 450, the server may identify information on the recipient.

In operation 460, the vehicle may determine whether the information on the recipient is registered in the server. The vehicle may determine whether the relevant phone number or account information is registered in the server at the time point that the sharing is activated.

When the recipient information is registered information, the vehicle may select a target for expanding the sharing in operation 470.

In operation 480, the server may transmit authentication information and location information to the recipient. When the target is selected by the vehicle, the server may share the location information with the selected target. When the information on the recipient is not registered, the server may share location information with a target determined depending on the type of a sharing service.

Figure 5:
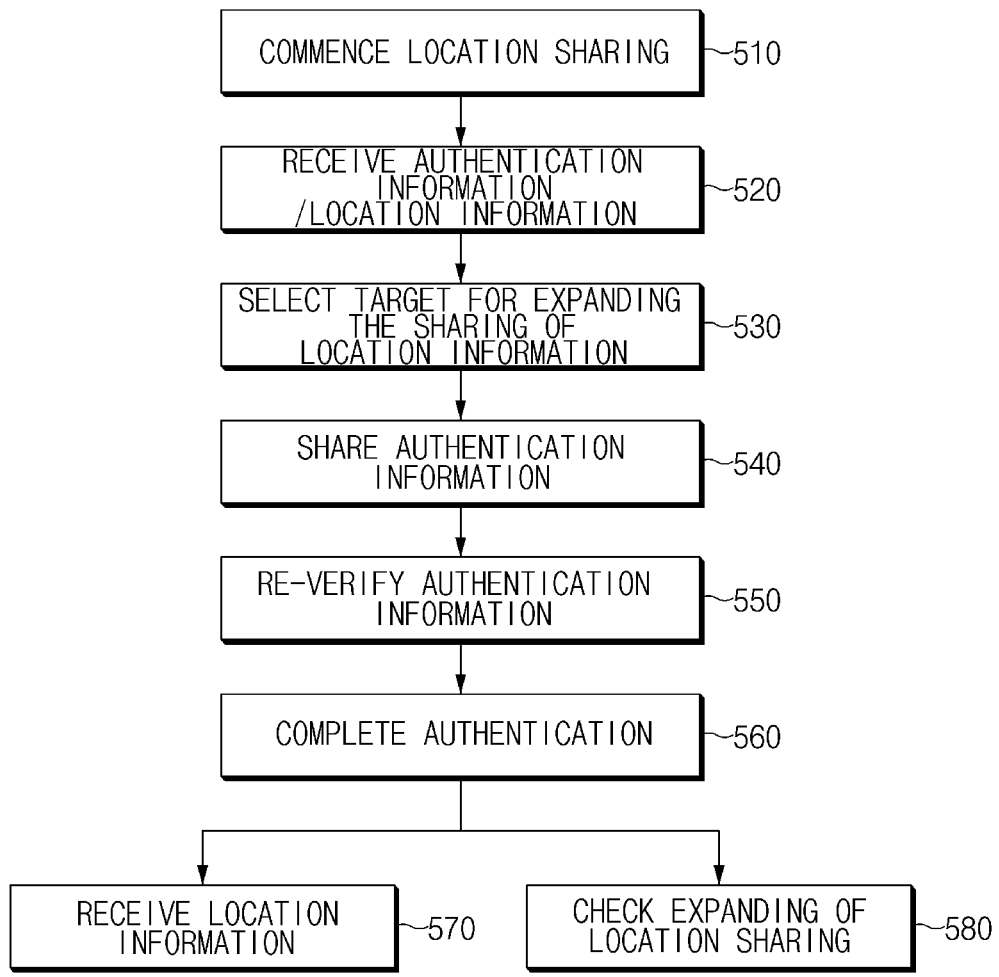
FIG. 5 is a flowchart illustrating a method for sharing location information of a vehicle according to embodiments of the present disclosure.

FIG. 5 is a flowchart illustrating a method for sharing location information of a vehicle, according to embodiments of the present disclosure. Hereinafter, it is assumed that the vehicle 210 or the server 220 of FIG. 2 performs the processor of FIG. 5.

As shown in FIG. 5, the server may commence location sharing in operation 510. The server may commence the location sharing to the sharing-target device using the representative ID information of the recipient.

In operation 520, the sharing-target device may receive authentication information and location information from the server. The sharing-target device may receive authentication information from the server, and may receive location information using the authentication information.

In operation 530, the sharing-target device may select a target (sharing expanding target) for expanding the sharing of the location information. The sharing expanding target may be selected by the vehicle and selected by the sharing-target device.

In operation 540, the sharing-target device may share the authentication information with the target for sharing the target.

In operation 550, the server may re-verify the authentication information from the sharing expanding target.

In operation 560, the server may complete the authentication by re-verifying the authentication information.

In operation 570, the sharing expanding target may receive the location information from the server.

In operation 580, the sharing-target device may check the expanding of the location sharing.

Figure 6:
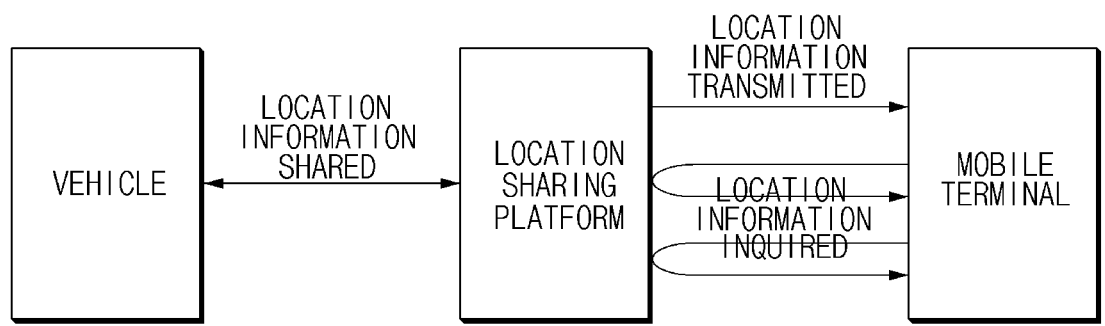
FIG. 6 is a view illustrating an exemplary operation of a system for sharing location information of a vehicle, according to embodiments of the present disclosure.

FIG. 6 is a view illustrating an exemplary operation of the vehicle location information sharing system, according to embodiments of the present disclosure.

As shown in FIG. 6, a vehicle may share location information of the vehicle with a location sharing platform. The vehicle may transmit ID information (e.g., a phone number or an ID) of a mobile terminal to the location sharing platform. The location sharing platform may transmit the authentication information to the mobile terminal using the ID information. The mobile terminal may acquire location information of the vehicle through the location sharing platform in real-time, using the authentication information.

Figure 7:
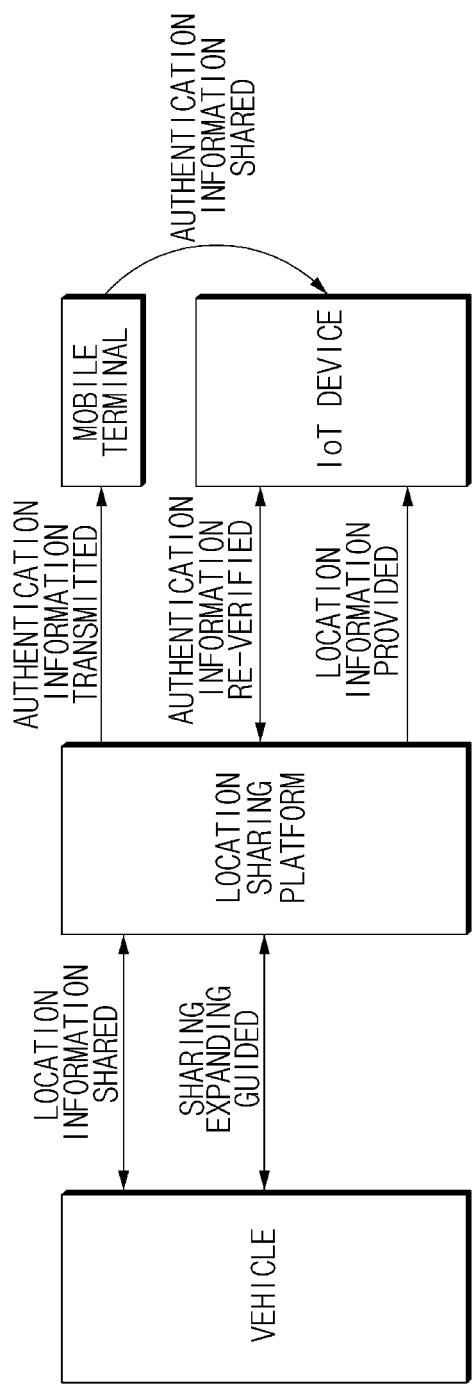
FIG. 7 is a view illustrating an exemplary operation of a system for sharing the location information of a vehicle, according to embodiments of the present disclosure.

FIG. 7 is a view illustrating an exemplary operation of a vehicle location information sharing system, according to embodiments of the present disclosure.

As shown in FIG. 7, a vehicle may share location information of the vehicle with a location sharing platform. The vehicle may transmit ID information (e.g., a phone number or an ID) of a mobile terminal to the location sharing platform. The vehicle may transmit information on a target for expanding sharing to the location sharing platform to expand the sharing. The location sharing platform may transmit authentication information to the mobile terminal using the ID information. The mobile terminal may acquire location information of the vehicle through the location sharing platform in real-time, using the authentication information. The mobile terminal may share the authentication information with an IoT device, which is the target for expanding the sharing, to expand the sharing. The IoT device may perform authentication using the authentication information. The location sharing platform may re-verify the authentication information of the IoT device. When the authentication is completed, the IoT device may acquire the location information of the vehicle through the location sharing platform. For example, the IoT device may determine whether the vehicle enters a parking lot of a house having the IoT device and exits out of the parking lot.

Figure 8:
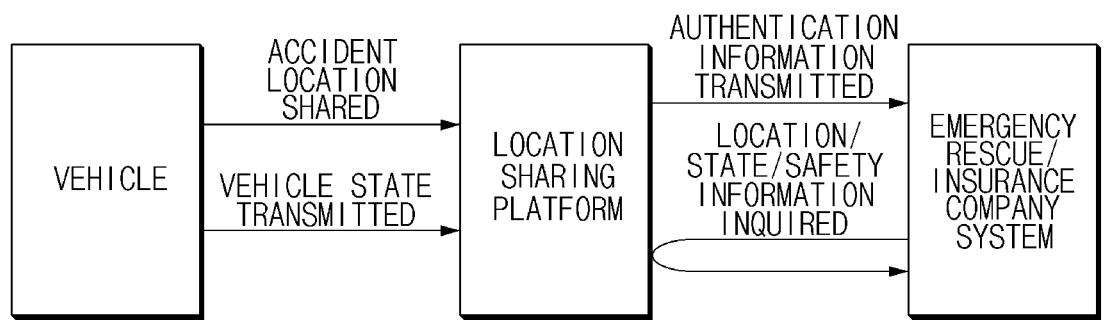
FIG. 8 is a view illustrating an exemplary operation of a system for sharing the location information of a vehicle, according to embodiments of the present disclosure.

FIG. 8 is a view illustrating an exemplary operation of a vehicle location information sharing system, according to embodiments of the present disclosure.

As shown in FIG. 8, a vehicle may detect car accident or car stealth. When the vehicle detects the car accident or the car stealth, the vehicle may transmit the location information and the state information of the vehicle to a location sharing platform. The location sharing platform may transmit the authentication information to an emergency rescue system or an insurance system, which is previously registered, even if the information on the recipient is not input. The emergency rescue system or the insurance system may acquire information on the location, the state, and the security of the vehicle through the location sharing platform, using the authentication information.

Figure 9:
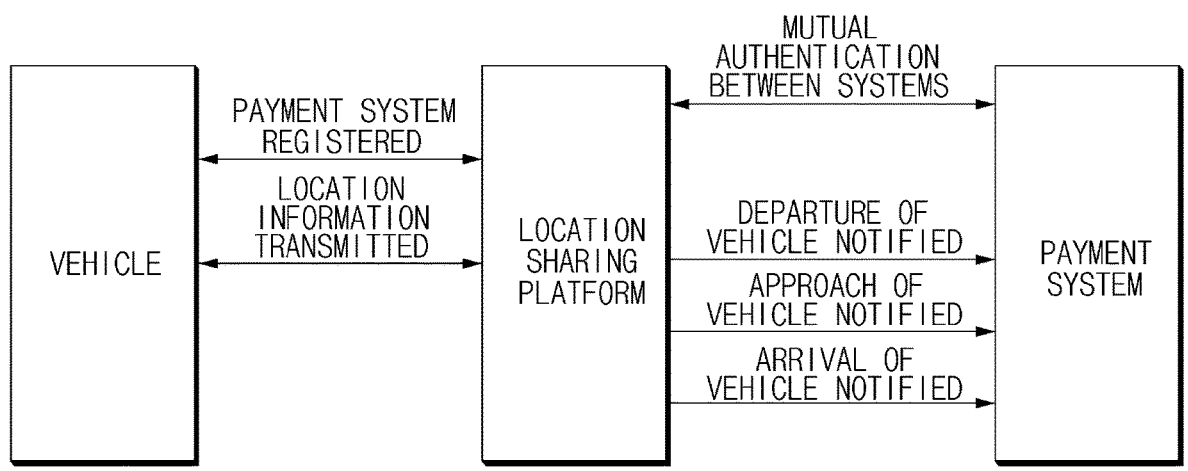
FIG. 9 is a view illustrating an exemplary operation of a system for sharing location information of a vehicle, according to embodiments of the present disclosure.

FIG. 9 is a view illustrating an exemplary operation of a vehicle location information sharing system, according to embodiments of the present disclosure.

As shown in FIG. 9, a location sharing platform and a payment system are affiliated with each other to authenticate one another. A vehicle may receive information on the payment system from the location sharing platform and may register the payment system as a target for sharing. The vehicle may share the location information of the vehicle with the location sharing platform. The location sharing platform may notify the departure of the vehicle to the payment system when the vehicle departures to a place for a product or service purchased through the payment system. The location sharing platform may notify the approach of the vehicle to the payment system when the vehicle approaches the place. When the vehicle arrives at the place, the location sharing platform may notify the arrival of the vehicle to the payment system. A provider of the product or the service may provide an appropriate service to a user of the vehicle using the notification.

Figure 10:
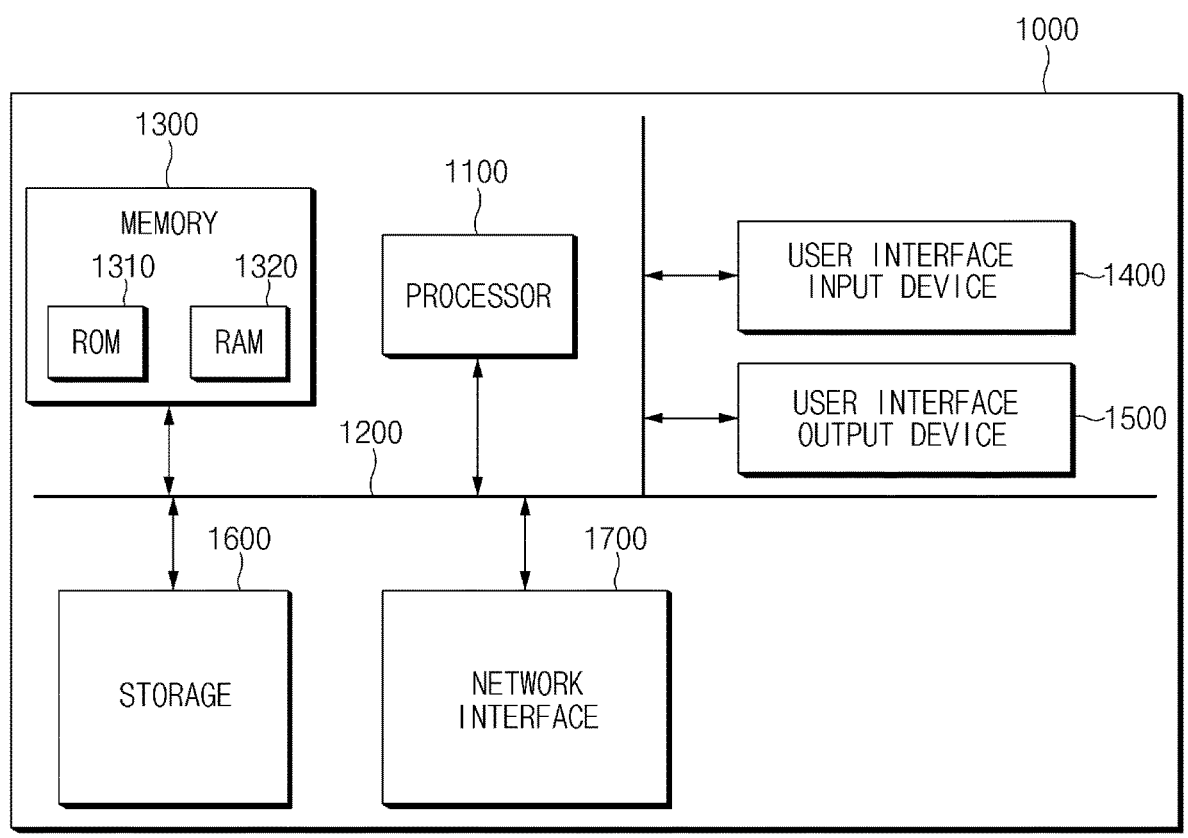
FIG. 10 illustrates a computing system, according to embodiments of the present disclosure.

FIG. 10 illustrates a computing system, according to embodiments of the present disclosure.

As shown in FIG. 10, the apparatus may be implemented through a computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

As described above, according to embodiments of the present disclosure, in the apparatus and the server for sharing the location information of the vehicle, the location information may be shared with various external devices, thereby improving the efficiency and the security in sharing information.

Various other effects may be directly or indirectly produced through the present disclosure.

While the present disclosure has been described with reference to certain embodiments, it will be apparent to those skilled in the art that various changes and modifications may be made without departing from the spirit and scope of the present disclosure.

Therefore, embodiments of the present disclosure described herein are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An system for sharing location information of a vehicle, comprising:
    a server;
    an apparatus;
    an external device; and
    the vehicle,
    wherein the server transmits authentication information to the apparatus corresponding to an identification information which is acquired by the server from the vehicle,
    wherein the apparatus includes:
        a communication circuit configured to communicate with the server; and
        a processor electrically connected with the communication circuit,
    wherein the processor is configured to:
    receive, via the communication circuit, the authentication information for sharing the location information of the vehicle from the server; and
    transmit, via the communication circuit, the authentication information to the external device, which is a target for sharing the authentication information,
    wherein the external device receives the location information from the server through authentication using the authentication information,
    wherein the vehicle periodically transmits the location information to the server based on a driving state of the vehicle and transmits the identification information to the server,
    wherein the vehicle selects the external device for expanding sharing of the location information when the apparatus is corresponding to the identification information, and
    wherein a sharing time of the location information, a contents of the location information and a method of acquiring the location information depend on a type of service provided by the external device.

2. The system of claim 1, wherein the apparatus selects the external device depending on a type of a service to be provided using the location information.

3. The system of claim 1, wherein the apparatus selects the external device based on user input provided to the apparatus.

4. The system of claim 1, wherein the external device is configured to:
    acquire the location information through a web-page provided by the server.

5. The system of claim 1, wherein the external device is configured to:
    acquire the location information in a HyperText Transfer Protocol (HTTP) response to an HTTP request provided by the server.

6. The system of claim 1, wherein the external device is configured to:
    acquire the location information through a notification provided by the server.

7. The system of claim 1, wherein the external device is configured to:
    periodically acquire the location information from the server using the authentication information.

8. The system of claim 1, wherein the external device is configured to:
    determine whether the vehicle enters and/or exits a specified location using the location information.

9. The system of claim 1, wherein the external device is configured to:
    determine whether the vehicle departs from, approaches, and/or arrives at a specified location using the location information.

10. The system of claim 1, wherein the location information includes information indicating at least one of a location, an origin, a destination, an expected arrival time, and a moving path of the vehicle.

11. A non-transitory computer readable medium containing program instructions for sharing location information of a vehicle, the program instructions when executed by a processor causing the processor to:

receive, via a communication circuit, authentication information for sharing the location information of the vehicle from a server; and transmit, via the communication circuit, the authentication information to an external device, which is a target for sharing the authentication information, wherein the processor receives the location information from the server through authentication using the authentication information, wherein a sharing time of the location information, a contents of the location information and a method of acquiring the location information depend on a type of service provided by the processor, wherein the vehicle periodically transmits the location information to the server based on a driving state of the vehicle and transmits the identification information to the server, and wherein the vehicle selects the external device for expanding sharing of the location information when the apparatus is corresponding to the identification information.

\* \* \* \* \*